United States Patent [19]

Kroon et al.

[11] Patent Number: 5,044,135
[45] Date of Patent: Sep. 3, 1991

[54] CLUSTER WORK STATION SYSTEM

[75] Inventors: Robert J. Kroon, Kent, Wash.;
Robert L. Russell, Kentwood, Mich.;
Linn A. Steinbeck, Kent, Wash.

[73] Assignee: Hon Industries Inc., Muscatine, Iowa

[21] Appl. No.: 617,919

[22] Filed: Nov. 21, 1990

Related U.S. Application Data

[63] Continuation of Ser. No. 365,959, Jun. 13, 1989, abandoned.

[51] Int. Cl.$^5$ .............................................. E04H 3/00
[52] U.S. Cl. ...................................... 52/239; 160/135; 108/60
[58] Field of Search .................... 108/60, 64; 312/198, 312/239, 257 A; 160/135; 52/239, 732, 36

[56] References Cited

U.S. PATENT DOCUMENTS

| | | | |
|---|---|---|---|
| 3,565,152 | 2/1971 | Cohn, Jr. ........................... | 160/135 |
| 3,698,104 | 10/1972 | Sutton ............................... | 108/60 X |
| 4,378,727 | 4/1983 | Doss ................................ | 108/60 X |
| 4,625,633 | 12/1986 | Martin ............................. | 52/239 X |

Primary Examiner—Richard E. Chilcot, Jr.
Assistant Examiner—Creighton Smith
Attorney, Agent, or Firm—Neuman, Williams, Anderson & Olson

[57] ABSTRACT

The present invention relates to a cluster office work station system having an equilateral polygonal shaped central core having five or more vertical side panels. The individual work stations are defined by wall panels connected to common lateral edges of the side panels and extending from the side panels at substantially right angles. Work surfaces and other accessories, like cabinets and shelves, are attached to the wall panels to complete the work stations and the central core functions as a common raceway for electrical, power and communication cabling. In addition, the connector for interconnecting the lateral edges of two adjacent side panels and a wall panel is adjustable to accommodate work stations having four or more side panels.

13 Claims, 2 Drawing Sheets

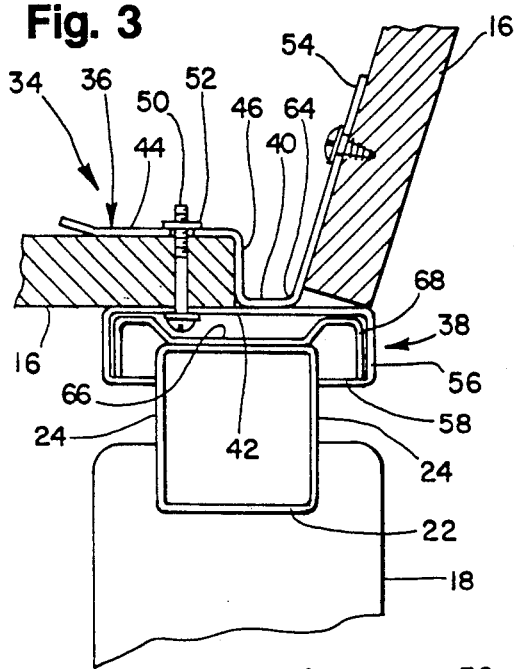
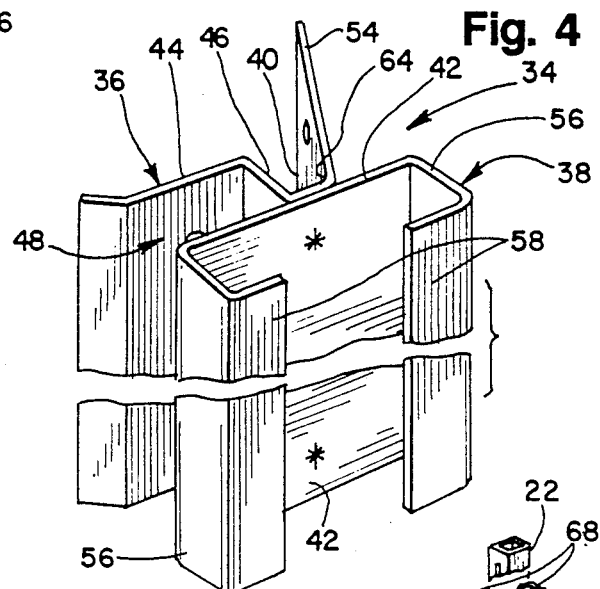
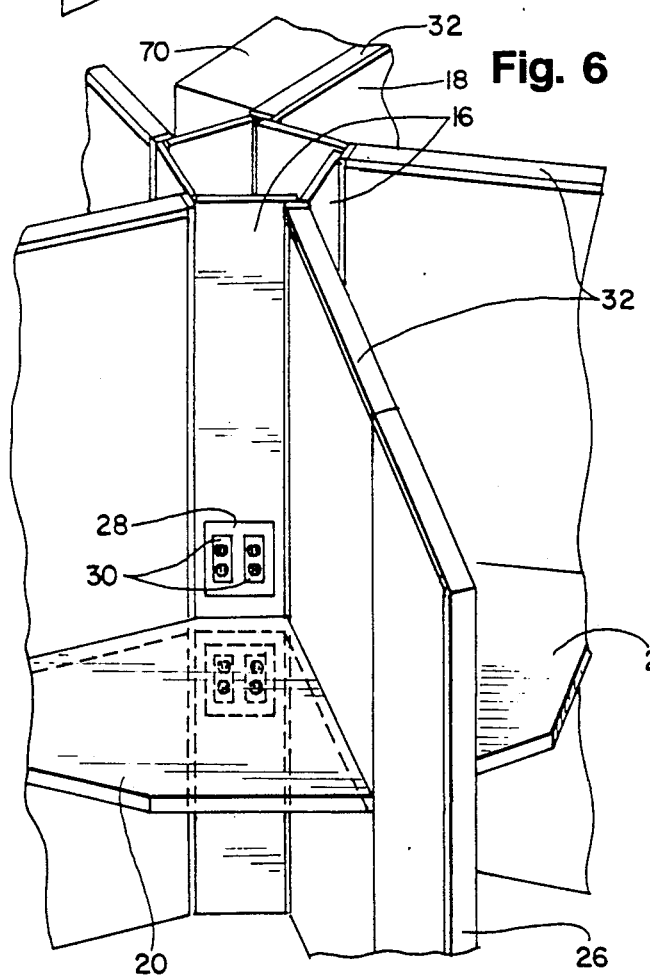
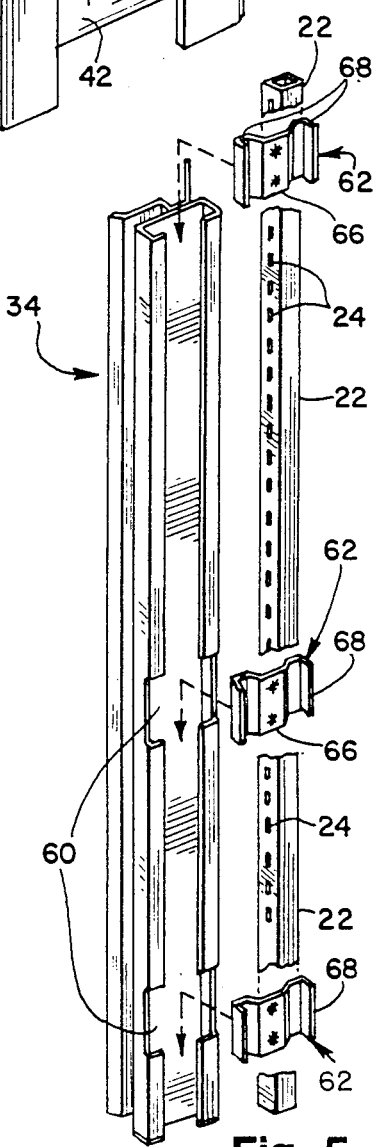

CLUSTER WORK STATION SYSTEM

This application is a continuation of application Ser. No. 07/365,959, filed June 13, 1989, now abandoned.

FIELD OF THE INVENTION

The present invention relates to a modular office work space system which is arrangeable in clusters or groups of five or more individual work stations about a central or common core. More particularly, the cluster work station system of the present invention offers flexibility in work space arrangement, efficient utilization of floor space, increased and accessible work surfaces and efficient accommodation and management of communication, power, computer and other types of cabling and wiring.

BACKGROUND OF THE INVENTION

Reconfigureable or modular office work space systems are well known including the arrangement of individual work spaces about a common support member or post. However, these conventional arrangements provide inefficient and awkward work stations and work surfaces. In particular, the physical geometry of the work surfaces make portions of the work surfaces not only difficult to access, but in many cases effectively nonutilizable. Moreover, the shape of the work surfaces can also hamper access to overhead storage areas.

In a conventional work space cluster of five or more work areas arranged around a central support post, the partitions separating the individual work areas typically extend along radial lines emanating from the geometric center of the central support post, similar to spokes on a wagon wheel. In these types of arrangements, the resulting work surfaces are wedge shaped, i.e., deep and increasingly narrow. Work surfaces of this shape result in a high percentage of wasted or non-utilizable space and render the overall work station inefficient. The geometrical shapes involved also make inefficient use of materials in production and, thus, lead to increased costs. In addition, the work surface can actually block a person from reaching a cabinet or shelf at the deepest, most remote portion of the work space.

In addition to inefficient space utilization, conventional work space systems are typically assembled with complex connectors which are awkward to use or with standard nut and bolt connectors, both of which require labor intensive assembly. Moreover, different brackets or connectors may be required to reconfigure the panels and partitions in alternative arrangements. Thus, the purchaser of the system is required to also purchase an inventory of supplemental connectors in the event that they might reconfigure or rearrange their layout into an alternative design at some future date. This increases the cost of purchasing the system as well as increases the cost in reconfiguring this system.

OBJECTS OF THE INVENTION

It is a general object of the present invention to provide an improved cluster work station system having five or more individual work stations.

It is a further object of the present invention to provide a cluster work station system which maximizes the work surface area for each individual work station as well as accessibility and utilization of materials.

It is another object of the present invention to provide an improved connector for attaching separating partitions to the central core of the cluster work station irrespective of the number of individual work stations in the cluster.

It is still a further object of the invention to provide a cluster work station system with improved cable and wire management.

Other objects and advantages of the invention will become apparent upon reading the following detailed description and appended claims, and upon reference to the accompanying drawings.

IN THE DRAWINGS

For a more complete understanding of this invention, reference should now be made to the embodiment illustrated in detail in the accompanying drawings and described below by way of examples of the invention.

FIG. 3 is an enlarged top plan view of a panel junction using a connector employing the present invention.

FIG. 4 is an elevated perspective view of the connector of FIG. 3.

FIG. 5 a perspective view of an unassembled connector of FIG. 3.

Figure 1:
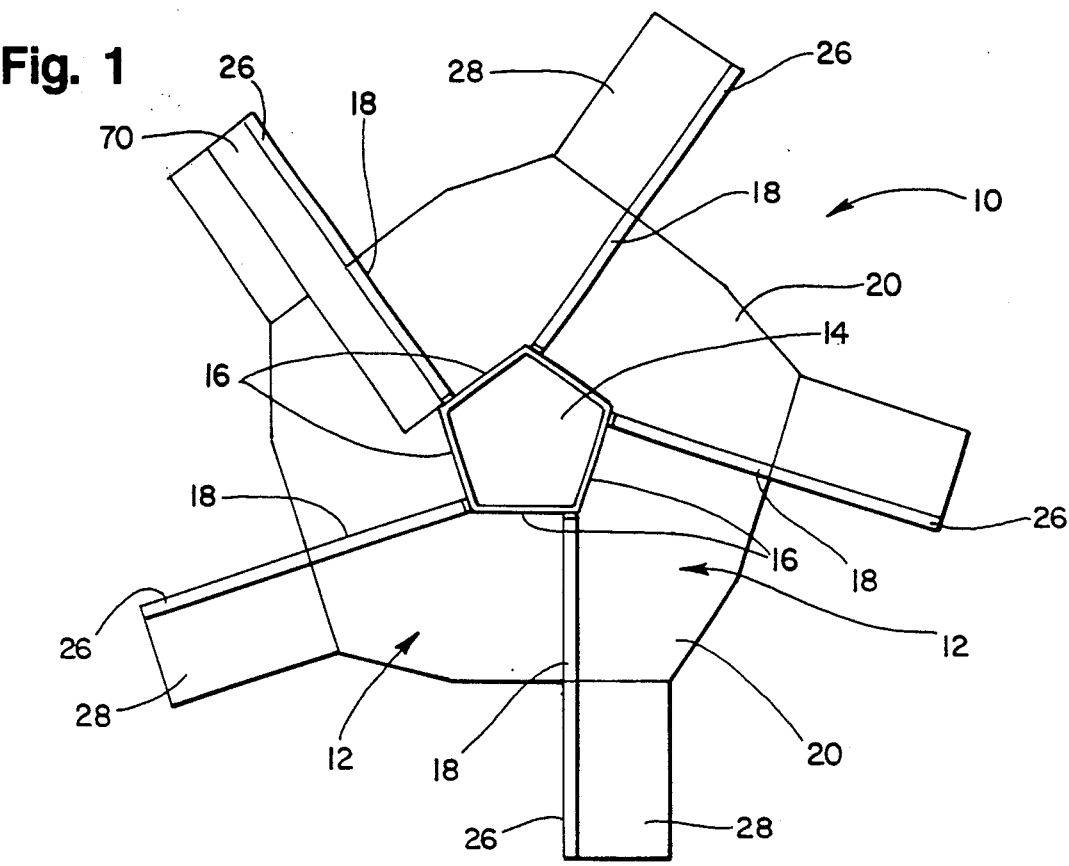
FIG. 1 is a top plan view of a 5 station cluster work station employing the present invention.

FIG. 6 is a partial elevational perspective view of the 5 station cluster work station of FIG. 1.

SUMMARY OF THE INVENTION

The present invention overcomes the inadequacies in conventional cluster work station systems and provides a cluster work station having five or more large, useable work stations. Rather than being wedge shaped or having a high amount of inefficient or non-utilizable space, the work stations of the present invention are large and accessible and more accurately correspond to the size and shape of a standard rectangular desk. In fact, the geometric shapes employed by the present invention can be manufactured more efficiently from stock materials with less loss or waste or material than conventional work surfaces. As a result, the work surface more efficiently accommodates a wide variety of office equipment, including computer or word processing terminals, keyboards, printers, telephones and other electronic equipment typically found in office environments today. Moreover, the work surfaces of the present invention do not hamper access to overhead storage areas or cabinets thereby allowing the overall work station to maximize its space utilization and efficiency.

In the preferred embodiment, an equilateral polygonal central core comprised of five or more side panels is provided. Separating partitions or wall panels are affixed to and extend from the central core to create five individualized work stations. The separating partitions or wall panels, rather than extending from the geometric center of the central core, extend perpendicularly from common lateral edges of the core side panels. The number of wall panels and, hence, the number of work stations, is dictated by the shape of the central core. In addition, the width of the core side panels plays a significant role in determining the overall size of the work stations and work surfaces.

The central core also functions as a single common raceway to provide electrical, telephone, computer and other types of cabling and wiring to each work station, thereby reducing the need to utilize wired wall panels.

The wall panels have slotted vertical posts or frame members at each end for supporting the work surface member. Each post has a plurality of slots to provide height adjustability to the work surface and to allow cabinets, shelves and other storage containers to be mounted to the wall panels above the work surfaces.

Furthermore, additional wall panels can be affixed to the ends of the existing wall panels to increase the size of the work station and extend the work surface area analgous to adding a "return work surface" to a standard desk.

The present invention further provides a connector which both interconnects the side panels of the central core and connects the wall panels to the central core. The connector or mounting bracket is comprised of two portions. The first portion extends substantially the full vertical height of the central core and interconnects adjacent vertical ends of the core side panels. In the preferred embodiment, different first portions are used depending upon the geometric shape of the core. A four sided central core uses one first portion, five and six sided cores use the same first portion and cores having more than six sides use still another first portion. However, it is also within the scope of this invention to use a single first portion which is adaptable for use with central cores having any number of sides.

A second portion attaches the wall panels to the central core. The second portion is essentially "C" shaped in cross-section and is positioned with its opening facing away from the central core and at a substantially right angle to one of the core side panels. Lateral slots or openings are provided at spaced locations along the opening of the C-shaped portion to receive clips mounted on the wall panels. Because the first portion of the connector is adjustable to accommodate and interconnect cores having five or more side panels (as well as cores having less than five side panels) the user does not have to maintain an inventory of different connectors should he desire to rearrange the cluster work station system at some future data.

DETAILED DESCRIPTION OF THE INVENTION

The relationship and functioning of the various elements of this invention will be better understood by the following detailed description. However, the embodiment of the invention described below is by way of example only and the invention is not limited to this embodiment. Furthermore, it should be understood that the drawings are not to scale and in certain instances details may have been omitted which are not necessary for an understanding of the present invention such as conventional details of fabrication and assembly.

Figure 2:
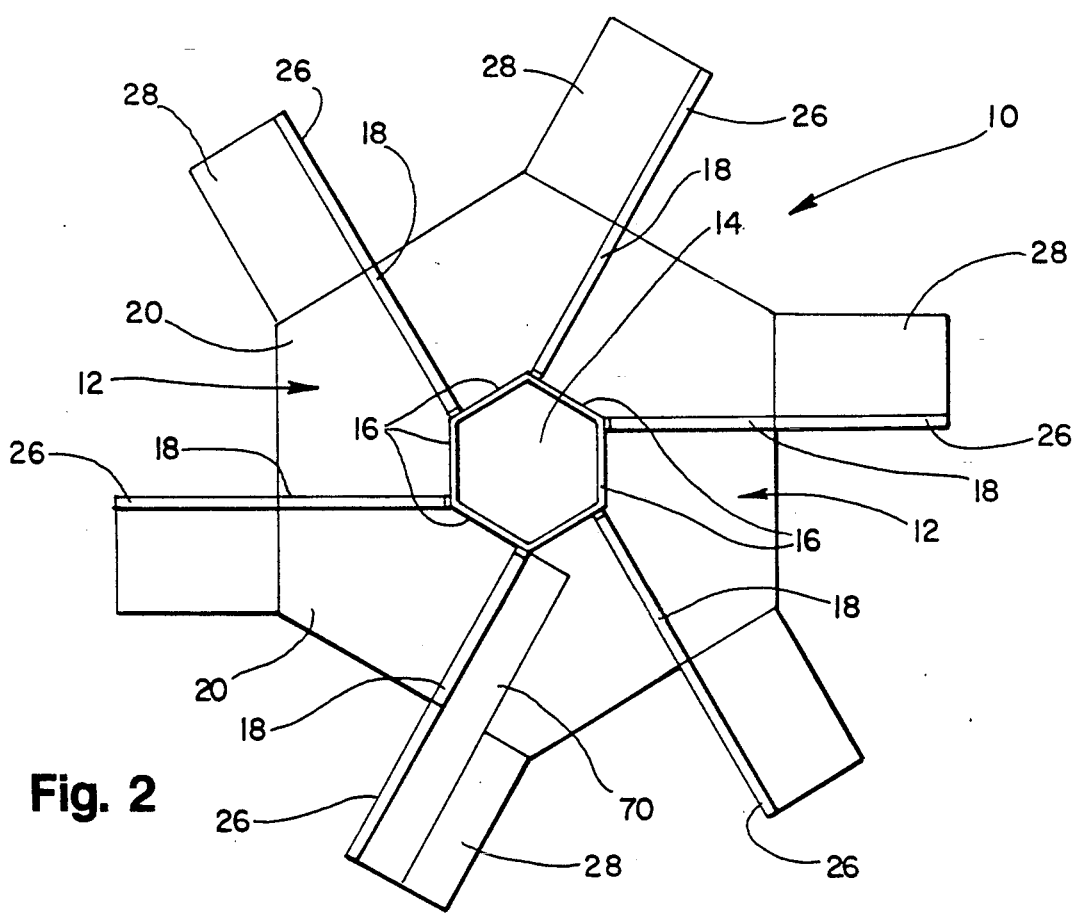
FIG. 2 is a top plan view of a 6 station cluster work station employing the present invention.

Generally, the cluster work station system 10 of the present invention provides five or more individualized work stations 12 arranged about a common central core 14. FIGS. 1 and 2 provide top plan views of a five and six station cluster work station, respectively. The core 14 is preferably an equilateral polygon having five or more side panels 16.

As can be seen in FIGS. 1 and 2, each wall panel 18 is connected to the central core 14 along a common lateral edge of each side panel 16. It is unimportant which lateral edge the wall panels 18 are connected to as long as each wall panel 18 is connected to the same side lateral edge, i.e., right or left, as the others. As can also be seen, the wall panels are positioned substantially perpendicularly to the respective side panels 16. The placement of the wall panels 18 in this manner, at substantially a right angle to the side panel, and along the lateral edge of the side panel, in combination with the width of the side panels 16, provide a work surface 20 which is more efficient and which offers more useable space than conventional cluster work surfaces. Moreover, the arrangement provides a work surface geometry which can be more efficiently manufactured from stock materials with less material discarded than with conventional work surfaces.

Each wall panel 18 has an internal frame of any suitable design. Vertical support members 22 are affixed to each edge of each panel, either as a part of the frame of the respective panel or as an auxiliary cooperative support component, in a known manner. In addition, the frame can be covered with an outer panel or skin to provide the panel 18 with an acceptable aesthetic appearance. As can be seen in FIGS. 3 and 5, the vertical frame members 22 are provided with a series of slots 24 arranged in a vertical column along the front and rear face. These slots cooperate with brackets (not shown) mounted on the work surfaces 20 to attach the work surfaces to the wall panels 18 in a known manner. Other accessories, such as cabinets, shelves and other storage devices 70 can be attached to the wall panels 18 in the same manner (FIGS. 1, 2 and 6).

The size of the work stations 12 can be enlarged by attaching additional wall panels 26 to the ends of wall panels 18. With these additional wall panels 26 in place, additional work surfaces 28 can be attached to the wall panels 26 to enlarge the work surface. The additional work surfaces 28 function similarly to a secretarial "return" and are attached to the slots 24 in the vertical frame members 22.

Besides acting as a support structure to which the work station separating partitions or wall panels 18 are attached, the core 14 is also a common vertical raceway for each work station 12. Electrical, telephone and other appropriate cabling, such as computer network cabling (not shown), is provided to the central core and accessible at each work station 12 through access panels 28 (FIG. 6). The number, type and arrangement of access panels depends, of course, upon the type of equipment the user plans to install. For example, while standard electrical sockets 30 are shown in FIG. 6, the access panel could also have telephone jacks, various types of computer connectors and electrical switches as well as many other types of connectors as appropriate.

The wall panels 18 of the present invention also may be provided with horizontal raceways disposed along the upper and lower edges of the panel 18. The upper vertical raceway (not shown) would be a channel shaped member disposed along the top horizontal edge of the panel and would be enclosed by cover cap 32. Similarly, a lower horizontal raceway (not shown) can be provided along the lower horizontal edge of the wall panel 18. Access to this raceway would be through hinged or removable sidewalls (not shown) which open outwardly to expose the raceway.

The connector 34 for interconnecting adjacent side panels 16 and for connecting wall panels 18 to the central core 14 is shown in FIGS. 3-5. The connector 34 has a four sided first portion 36 and a substantially "C" shaped second portion 38. In the preferred embodiment, side 40 of the first portion 36 is spot welded to the back side 42 of the second portion 38.

As best seen in FIG. 3, the two portions 36 and 38 cooperate to align and secure the side panels 16. Specifically, sides 44 and 46 of the first portion 36 and the back side 42 of the second portion 38 form a receptive channel 48 which aligns and engages the lateral edge of a side panel. In the preferred embodiment, standard bolts 50 and nuts 52 are employed to lock the side panel in position. The leading edge of side 44 is flared to more easily receive the side panel 16. Similarly, side 54 of the first portion 36 cooperates with the back side 42 of the second portion 38 to align a second side panel 16. The side panel 16 is affixed to the connector 34 by multiple screws 54.

The "C" shaped second portion, besides having a rear or back wall 42 has two side walls 56 delimited by inwardly directed return flanges 58. As can be seen in FIG. 5, the return flanges 58 are provided with multiple openings or lateral slots 60 to accommodate brackets 62 affixed to the vertical frame member 22 attached to the wall panel.

The connector 34 shown in FIG. 3 is connecting two adjacent side panels 16 of a five sided central core 14. To accommodate central cores 14 having more than five sides, the corner 64, between the side 40 and side 54, is opened by bending those two sides away from each other. Similarly, to accommodate a central core 14 of less than five sides, the angle formed at the corner 64 is reduced. Of course, it is also contemplated that the connectors can be manufactured in a variety of geometries to satisfy a variety of final shapes for clusters. In this manner, the connectors need not be adjusted in the field but merely substituted for a different connector having the appropriate geometric configuration.

As seen in FIG. 5, the brackets 62 have an exaggerated "M" or gull wing shape and are adapted to be engaged by and encompassed within the "C" shaped portion 38 of the connector 34. More specifically, the brackets 62 have a central portion 66 which is attached to the vertical frame member 22 of the wall panels 18 by screws or other known connecting means and two engaging arms 68, which are symmetrical mirror images of each other. The wall panels 18 and the "C" shaped portion 38 of the connector 34 have the same number of brackets 62 and lateral slots 24, respectively, and they are interspaced the same vertical distance.

To connect a wall panel 18 to the core 14, the brackets 62 are positioned such that the wall panel must be first lifted off the floor to align the brackets 62 with the slots 24. The brackets 62 are then inserted into the channel 34 formed by the "C" shaped portion 38 of the connector 34 and the wall panel 18 is lowered to rest on the floor. When engaged, the arms 68 are securely held in position by the "C" shaped portion 38 (FIG. 3) to thereby secure the wall panel 18 to the core 14.

While the preferred embodiment of the present invention is shown, one will understand that the invention is not limited to this embodiment since those skilled in the art to which the invention pertains may make modifications of the principles of the invention, particularly upon considering the foregoing teachings, without departing from the spirit of the invention. By the appended claims, the applicant intends to cover any such modifications and other embodiments as incorporate those features which constitute the essence of this invention.

What is claimed is:

1. A space partition system comprising:
    at least one core element having five or more vertical side panels joined together along adjacent edges to form a hollow enclosure;
    a plurality of elongated connecting brackets for interconnecting the edges of adjacent vertical side panels, each connecting bracket having a first portion disposed between adjacent lateral interior edges of adjacent vertical side panels and extending substantially the entire vertical height of said vertical side panels and having a second portion disposed along the lateral exterior surface of one of said adjacent side panels and also extending substantially the entire vertical height of said side panels;
    a plurality of longitudinally extending slots disposed in said second portion of said connecting bracket;
    a plurality of wall panels, each of said wall panels having a plurality of mounting brackets disposed along at least one lateral edge, said mounting brackets adapted to fit within said slots in said connecting bracket to position said wall panels along a common lateral edge of said side panels at a substantially right angle to said side panels.

2. The partition system of claim 1 further comprising work surfaces extending between adjacent wall panels and supported by said wall panels and said side panels.

3. The partition system of claim 2 further comprising electronic control and access means disposed in said vertical side panels adjacent said work surfaces.

4. The partition system of claim 2 further comprising storage cabinets attached to said wall panels above said work surfaces.

5. The partition system of claim 2 further comprising a horizontal raceway disposed along the lateral edge of the work surface.

6. The partition system of claim 5 further comprising access panels disposed on said side panels, said access panels containing electrical outlets adapted to receive a plurality of electrical equipment.

7. An office workspace partition system for receiving work surface components in individual work stations defined thereby, comprising:
    a central core member about which individual work stations are arranged, said core member having at least five sides of substantially equivalent height and width, said sides positioned to form an enclosed equilateral polygon;
    connecting means disposed between and interconnecting adjacent lateral edges of said sides, said connecting means disposed over substantially the full vertical height of said sides;
    a plurality of generally planar wall panels, each of said wall panels having mounting means disposed along one lateral end and adapted to engage said connecting means to position the respective wall panel substantially perpendicular to the same lateral edge of a respective side of said core member and defining therewith a work station having a substantially right-angular internal corner defined by said wall panel and the respective side of said core for receiving a work surface component in interfitting relation in said corner.

8. The invention as in claim 7 and including a work surface component disposed in each of a plurality of said work stations, each of said work surface surface components having a right-angular corner interfitted into said internal corner defined by the respective one of said wall panels and the respective side of said core.

9. The invention as in claim 8 wherein each of said work surface components includes a rectangular end configuration adjacent the respective wall panel.

10. A connector for joining the lateral edges of three panels comprising: a first engaging means for engaging the lateral edge of a first panel, alignment means laterally spaced from said first engaging means and positioned to align the lateral edge of a second panel at an angle of more than 90 and less than 180 degrees to the first panel and second engaging means for engaging the lateral edge of a third panel and positioning the third panel at substantially a right angle to the engaged lateral edge of the first panel.

11. In a reconfigurable office work station system having a central core with multiple vertical side panels and vertical wall panels attached to the side panels and extending outwardly from the core to define multiple individual work stations arranged around the core, the improvement comprising: an elongate connector for interconnecting the adjacent lateral edges of adjacent side panels and the lateral edge of a wall panel, said connector comprising a first engaging means for engaging the lateral edge of a side panel of the core, alignment means laterally spaced from said engaging means and positioned to align the adjacent side panel at an obtuse angle to the first side panel and a second engaging means for engaging the lateral edge of a wall panel and positioning the wall panel at substantially a right angle to the engaged lateral edge of said first side panel.

12. A connector for joining the lateral edges of three vertical panels comprising: an elongate first portion having at least four sides, the first and third sides in spaced substantially parallel alignment, the second side aligned substantially perpendicular to the first and third sides and interconnecting the first and third sides, the fourth side extending from the third side at an angle of 90 or more degrees from the plane of the third side; and a second elongate portion attached to said first portion, said second portion defined by C shaped structural member having a base, two opposed parallel sidewalls extending from the edges of the base and inwardly directed return flanges positioned along the outer edges of the side walls to define an elongate slot, said first and second portions joined such that the elongate slot of the second portion opens in a direction substantially opposite from the direction the fourth side of the first portion extends.

13. The invention as in claim 10 wherein each side of said core member is formed by a core panel, and said connecting means and said mounting means comprise an elongate connector interconnecting the adjacent lateral edges of each adjacent pair of said core panels and the adjacent lateral edge of the respective adjacent wall panel, each of said connectors comprising a first engaging means for engaging the lateral edge of a side panel of the core, alignment means laterally spaced from said engaging means and positioned to align the adjacent side panel at an obtuse angle to the first side panel and a second engaging means for engaging the lateral edge of a wall panel and positioning the wall panel at substantially a right angle to the engaged lateral edge of said first side panel.

* * * * *

UNITED STATES PATENT AND TRADEMARK OFFICE
CERTIFICATE OF CORRECTION

PATENT NO. : 5,044,135

DATED : September 3, 1991

INVENTOR(S) : Kroon, et al.

It is certified that error appears in the above-identified patent and that said Letters Patent is hereby corrected as shown below:

Column 2, line 15, before "detail" insert -- greater --.

Column 3, line 40, "data" should read -- date --.

Column 6, line 62, delete the second occurrence of the word "surface".

Signed and Sealed this

Twenty-third Day of November, 1993

Attest:

BRUCE LEHMAN

Attesting Officer

Commissioner of Patents and Trademarks